United States Patent [19]
Yamada et al.

[11] Patent Number: 5,605,512
[45] Date of Patent: Feb. 25, 1997

[54] GOLF BALL

[75] Inventors: Mikio Yamada, Kobe; Kazushige Sugimoto, Shirakawa, both of Japan

[73] Assignee: Sumitomo Rubber Industries, Ltd., Hyogo-ken, Japan

[21] Appl. No.: 531,298

[22] Filed: Sep. 20, 1995

[30] Foreign Application Priority Data

Sep. 20, 1994 [JP] Japan .................................. 6-252815

[51] Int. Cl.$^6$ .................................................. A63B 37/08
[52] U.S. Cl. ........................ 473/354; 473/373; 473/385; 473/358
[58] Field of Search .................................. 473/354, 373, 473/385, 356, 358

[56] References Cited

U.S. PATENT DOCUMENTS

| | | | |
|---|---|---|---|
| 4,625,964 | 12/1986 | Yamada | 473/373 |
| 4,858,924 | 8/1989 | Saito et al. | 473/373 |
| 5,467,994 | 11/1995 | Moriyama et al. | 473/354 |
| 5,511,791 | 4/1996 | Ebisuno et al. | 473/354 |

*Primary Examiner*—George J. Marlo
*Attorney, Agent, or Firm*—Birch, Stewart, Kolasch & Birch, LLP

[57] ABSTRACT

It is a main object of the present invention to impart a high impact resilience to a thread wound golf ball using a liquid center wherein a center bag is filled with a liquid, thereby improving a flying distance, while maintaining a good hit feeling and control properties.

The center bag of the liquid center is made of a crosslinked rubber obtained from a rubber composition comprising:

(a) a rubber component containing a mixture of 10 to 80% by weight of cis-1,4-polybutadiene and 90 to 20% by weight of a natural rubber or cis-isoprene rubber as a base rubber (b) either a metal salt of an unsaturated carboxylic acid selected from the group consisting of acrylic acid and methacrylic acid, or a combination of the unsaturated carboxylic acid and metal oxide forming a metal salt with the unsaturated carboxylic acid, and (c) a peroxide crosslinking agent, the component (b) being present in an amount 3 to 20 parts by weight based on 100 parts by weight of the component (a) when calculated in terms of an amount of the unsaturated carboxylic acid.

13 Claims, 1 Drawing Sheet

GOLF BALL

FIELD OF THE INVENTION

The present invention relates to a thread wound golf ball which comprises a liquid center made of a center bag filled with liquid, a thread layer wound on the liquid center and a cover covering the thread layer.

BACKGROUND OF THE INVENTION

Golf balls are classified roughly into a thread wound golf ball and a solid golf ball. The thread wound golf ball is superior in hit feeling (feeling at the time of hitting) and control properties. The solid golf ball has a large impact resilience and attains a large flying distance but has a problem that hit feeling and control properties are inferior.

The thread wound golf ball is obtained by winding a thread rubber at a stretched state around a center to form a thread wound core, and then covering a cover on the thread wound core. The center of the thread wound golf ball is classified into two types, i.e. liquid center wherein a rubber bag referred to as a center bag is filled with a solution or pasty liquid, and solid center of a rubber crosslinked material having a high impact resilience.

Among them, the solid center is easily produced and is comparatively cheap and, therefore, it has been used as the center of the thread wound golf ball for middle- to high-class golfers, mainly.

To the contrary, the thread wound golf ball using the liquid center is superior to a conventional solid golf ball as well as thread wound golf ball using the above solid center in hit feeling and control properties. Therefore, highest-class golfers such as professional and top-amateur golfers like it. However, it is difficult to produce the thread wound golf ball using the liquid center and, therefore, the liquid center is applied only for a highest-grade thread wound golf ball at present.

Hereinafter, a process for producing a liquid center and a thread wound golf ball using it will be explained.

Firstly, a liquid center is made either by pouring a liquid into a mold cooled with a refrigeration medium, freezing the liquid to make a spherical core, covering a non-crosslinked rubber bag on this spherical core, or by pouring a liquid into a crosslinked rubber bag using a syringe and sealing a mark formed by an injection.

Then, the liquid center thus obtained is changed into a state that the liquid center is hard and has a shape retention by freezing, and a thread rubber is wound at a stretched state around the liquid center to form a thread wound core. The thread wound core is covered with a cover and, if necessary, the surface is painted to produce a thread wound golf ball.

The thread wound golf ball produced by using this liquid center has such characteristics that hit feeling is good and control properties are excellent. However, the impact resilience of the liquid center is lower than that of the solid center and, therefore, the flying distance is small. Accordingly, average golfers, who think flying distance important, do not like the golf ball using the liquid center. Therefore, it is necessary to use a thread rubber having a high impact resilience so as to obtain a thread wound golf ball which has a high impact resilience and attains a large flying distance, which results in rise in cost.

As described above, the thread wound golf ball using liquid center has a such characteristics that the hit feeling is good and control properties are excellent. However, the flying distance is inferior to the other golf ball and, therefore, average golfers, who think the flying distance important, do not like the golf ball using the liquid center.

OBJECTS OF THE INVENTION

Accordingly, a main object of the present invention is to provide a thread wound golf ball that average golfers like, which attains a large flying distance within a limited range of an initial velocity, while maintaining a good hit feeling and excellent control properties of a thread wound golf ball using a liquid center.

This object as well as other objects and advantages of the present invention will become apparent to those skilled in the art from the following description with reference to the accompanying drawings.

SUMMARY OF THE INVENTION

Figure 1:
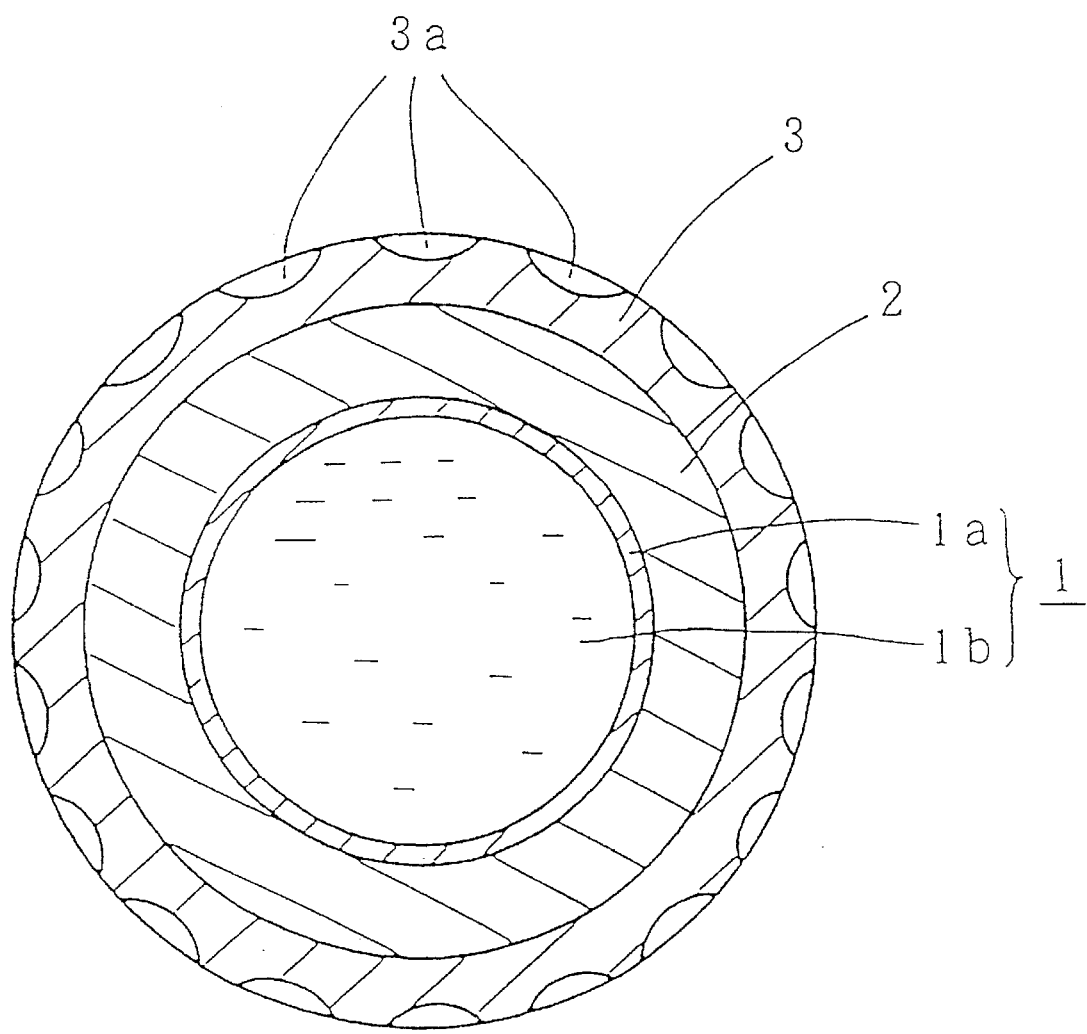
FIG. 1 is a schematic cross section illustrating one embodiment of a thread wound golf ball of the present invention.

That is, the present invention provides a thread wound golf ball comprising a liquid center composed of a center bag filled with liquid, a thread layer wound on the liquid center and a cover covering the thread layer, wherein the center bag is made of a crosslinked rubber obtained from a rubber composition comprising:

(a) a rubber component containing a mixture of 10 to 80% by weight of cis-1,4-polybutadiene and 90 to 20% by weight of a natural rubber or cis-isoprene rubber as a base rubber (b) either a metal salt of an unsaturated carboxylic acid selected from the group consisting of acrylic acid and methacrylic acid, or a combination of the unsaturated carboxylic acid and metal oxide forming a metal salt with the unsaturated carboxylic acid, and (c) a peroxide crosslinking agent, the component (b) being present in an amount 3 to 20 parts by weight based on 100 parts by weight of the component (a) when calculated in terms of an amount of the unsaturated carboxylic acid.

DETAILED DESCRIPTION OF THE INVENTION

In the present invention, the base rubber of the rubber component (a) of the rubber composition for forming the center bag of the liquid center can be a mixture (blend material) of 10 to 80% by weight of cis-1,4-polybutadiene and 90 to 20% by weight of a natural or cis-isoprene rubber. The rubber composition for forming center bag is prepared by formulating (b) an unsaturated carboxylic acid selected from the group consisting of methacrylic or acrylic acid or a metal salt thereof and (c) a peroxide crosslinking agent and, if necessary, a metal oxide such as zinc oxide, barium sulfate as a weight controller and a filler such as calcium carbonate in the rubber component (a) containing the above mixture of cis-1,4-polybutadiene and natural or cis-isoprene rubber as the base rubber.

The center bag of the liquid center in the thread wound golf ball of the present invention is characterized by forming the rubber component containing a mixture of cis-1,4-polybutadiene and natural or cis-isoprene rubber as the base rubber of a rubber crosslinked material obtained by crosslinking with a metal salt of acrylic acid or methacrylic acid and a peroxide crosslinking agent. Thereby, there can be obtained a thread wound golf ball which has a high impact resilience and attains a large flying distance in comparison with a golf ball using a center bag formed of a conventional rubber vulcanized material subjected to sulfur vulcanization.

In the base rubber of the above rubber component, an amount of the cis-1,4-polybutadiene and natural rubber or cis-isoprene rubber is 10 to 80% by weight and 90 to 20% by weight, respectively. When the amount of the cis-1,4-polybutadiene is smaller than 10% by weight, high impact resilience is not obtained. On the other hand, when the amount of cis-1,4-polybutadiene exceeds 80% by weight, molding properties is inferior and it is difficult to make a center bag. Particularly preferred amount of the cis-1,4-polybutadiene and natural rubber or cis-isoprene rubber is 15 to 60% by weight and 85 to 40% by weight, respectively. Furthermore, the rubber component of the rubber composition for center bag may be constituted only with the above base rubber of the mixture of the cis-1,4-polybutadiene and natural or cis-isoprene rubber, or may be constituted with a mixture wherein other rubbers are mixed with the above base rubber. Examples of the other rubber are styrene-butadiene rubber, ethylene-propylene-diene rubber (EPDM), butadiene rubber other than cis-1,4-polybutadiene, butyl rubber, etc. When the rubber component is constituted by mixing the other rubbers with the above base rubber, an amount of the base rubber is preferably not less than 80% for the rubber component.

Preferred examples of the metal salt of the unsaturated carboxylic acid selected from acrylic acid and methacrylic acid as the co-crosslinking agent include zinc methacrylate, zinc acrylate, magnesium methacrylate, calcium methacrylate, etc. Regarding the metal salt of the unsaturated carboxylic acid, the unsaturated carboxylic acid (i.e. methacrylic or acrylic acid) and a metal oxide such as zinc oxide, magnesium oxide, calcium oxide, etc. may be formulated at the time of preparing the rubber composition to form zinc methacrylate, zinc acrylate, magnesium methacrylate, calcium methacrylate, etc. in the rubber composition. The metal salt of the unsaturated carboxylic acid may be used alone or in combination thereof.

An amount of the metal salt of the unsaturated carboxylic acid for the rubber component is 3 to 20 parts by weight, based on 100 parts by weight of the rubber component, when it is calculated in terms of the amount of the unsaturated carboxylic acid (i.e. methacrylic or acrylic acid). When this amount is represented by an amount of the metal salt of the unsaturated carboxylic acid, it can be 4 to 40 parts by weight, based on 100 parts by weight of the rubber component. When the unsaturated carboxylic acid is formulated intact into the rubber composition, it is necessary to formulate metal oxides, such as zinc oxide, magnesium oxide, calcium oxide, etc., so as to react with the unsaturated carboxylic acid to form a metal salt. In addition, since the metal oxides such as zinc oxide, magnesium oxide, calcium oxide, etc. also act as a filler for weight controlling, metal oxides such as zinc oxide, magnesium oxide, potassium oxide, etc. are preferably formulated in an amount of 5 to 100 parts by weight, based on 100 parts by weight of the rubber component, for the purpose of acting as co-crosslinking agent and weight controller.

Furthermore, when formulating it in the form of a metal salt of the unsaturated carboxylate, the metal oxides such as zinc, etc, are preferably formulated in an amount of 5 to 30 parts by weight, based on 100 parts by weight of the rubber component.

As described above, when formulating in the form of the unsaturated carboxylic acid, it is necessary to formulate in an amount of 3 to 20 parts by weight, based on 100 parts by weight of the rubber component. When formulating in the form of the metal salt of the unsaturated carboxylate, it is necessary to formulate in an amount of 4 to 40 parts by weight, based on 100 parts by weight of the rubber component. When the amount of the unsaturated carboxylic acid or the metal salt thereof is smaller than the above range, the sufficient hardness is hardly obtained and reinforcing properties are inferior, which results in deterioration of durability. On the other hand, when the amount is larger than the above range, hardness becomes too hard and hit feeling is likely to be deteriorated. It is preferred that the amount of the unsaturated carboxylic acid is 5 to 18 parts by weight based on 100 parts by weight of the rubber component and that of the metal salt of the unsaturated carboxylic acid is 7.5 to 27 parts by weight based on 100 parts by weight of the rubber component.

The peroxide crosslinking agent is one which is known to the art, but includes dicumyl peroxide, 1,1-bis-3,3,5-trimethylcyclohexane, etc. It is preferred that the peroxides are formulated in an amount of 0.3 to 3 parts by weight, based on 100 parts by weight of the rubber component. When the amount of the peroxide to be formulated is smaller than the above range, the hardness is insufficient, which results in deterioration of durability. On the other hand, when the amount exceeds the above range, the hardness becomes too large and the hit feeling is likely to be deteriorated.

In addition to the above components (a), (b) and (c), an additive, such as color agent, peptizer, zinc stearate, etc. may be formulated in the rubber composition for center bag of liquid center.

The liquid with which the center bag is filled can be the same as that of a conventional one, and examples thereof include water, an aqueous solution wherein zinc chloride is dissolved in water, a paste wherein barium sulfate is dispersed in water, etc.

Examples of the typical paste for liquid center include the followings.

| Ingredient | Amount (parts by weight) |
| --- | --- |
| Water | 88 |
| Glycerine | 12 |
| Clay | 20 |
| Barium sulfate | 50 to 150 |

The specific gravity is appropriately adjusted by changing the amount of barium sulfate. In general, the specific gravity of the paste is preferably not less than 1.1, particularly within the range of 1.3 to (3.0).

The crosslinking of the rubber composition for center bag in case of making the liquid center is conducted with heating at 150° to 160° C. for about 15 to 30 minutes. A thickness of the center bag is preferably 1 to 3 mm, particularly 1.5 to 2 mm. A hardness (measured using a JIS-A type hardness tester) of the center bag after crosslinking is preferably 40 to 60. A diameter of the liquid center may be the same as that of a conventional one, and is generally 25 to 34 mm, preferably 27 to 32 mm.

In order to produce a thread wound golf ball, a thread rubber is wound at a stretched state around the liquid center to make a thread wound core, which is then covered with a cover. The thread rubber can be the same as that of a conventional one. Typical examples thereof include a highmodulus thread rubber of a natural or cis-isoprene rubber or a blend rubber thereof (width: 0.4 to 0.6 mm, thickness: 0.13 to 0.16 mm).

The cover can be a balata cover and a resin cover of an ionomer resin as a main material. Typical examples of the composition for balata cover include the followings. Composition for balata cover:

| Ingredients | Amount (parts by weight) |
| --- | --- |
| Elastomer | 90 |
| Natural rubber | 10 |
| Filler | 18 |
| Sulfur + accelerator | 2 |

Examples of the elastomer include synthetic trans-polyisoprene, guttapercha, balata(trans-polyisoprene), high-styrene resin, 1,2-polybutadiene, trans-polybutadiene, etc. The most popular elastomer at present is a synthetic trans-polyisoprene (trade name: TP-301) manufactured by Kuraray Co., Ltd. A preferable hardness (measured using a JIS-C type hardness tester) of the cover is 70 to 85.

As a method for covering the cover on the thread core, there can be used a method comprising molding a cover composition into a semi-spherical half-shell in advance, covering a thread wound core with two half-shells and then subjecting to a pressure molding in a mold, of a method comprising subjecting a cover composition to injection molding directly to cover a thread wound core. A thickness of the cover is preferably about 1 to 4 mm. In case of cover molding, dimples may be optionally formed on the surface of the golf ball. Also, the golf ball may be optionally subjected to paint finishing, stamping, etc.

Then, the structure of the golf ball of the present invention will be explained with reference to the accompanying drawing FIG. 1 is a schematic cross section illustrating one embodiment of the thread wound golf ball of the present invention. In FIG. 1, 1 is a liquid center which formed from a center bag 1a filled with a liquid 1b. The center bag 1a is formed of a rubber crosslinked material prepared by crosslinking a rubber composition comprising a mixture of cis-1,4-polybutadiene and a natural or cis-isoprene rubber in a specific proportion as a base rubber, the details of which are as described above. Furthermore, as the liquid 1b, water, solution, paste, etc. can be used.

2 is a thread rubber which is wound around the above liquid center 1. 3 is a cover, and a thread wound core comprising the liquid center 1 and thread rubber 2 is covered with the cover 3. In addition, a suitable number of dimples 3a are provided on the cover 3.

As described above, according to the present invention, there could be provided a thread wound golf ball which attains a large flying distance, by imparting a high impact resilience to a thread wound golf ball using a liquid center, while maintaining a good hit feeling and excellent control properties.

EXAMPLES

The following Examples and Comparative Examples further illustrate the present invention in detail but are not to be construed to limit the scope thereof.

Examples 1 to 2 and Comparative Examples 1 to 2

A liquid center was made using a rubber composition for center bag of the formulation composition shown in Table 1 and a paste of the formulation composition shown in Table 2, respectively. Incidentally, the units of the amount described in Table 1 are parts by weight.

TABLE 1

|  | Example No. |  | Comparative Example No. |  |
| --- | --- | --- | --- | --- |
|  | 1 | 2 | 1 | 2 |
| Cis-1,4-polybutadiene *1 | 40 | 15 | 0 | 40 |
| Cis-isoprene rubber *2 | 60 | 85 | 100 | 60 |
| Zinc oxide | 20 | 20 | 5 | 5 |
| Sulfur | 0 | 0 | 2 | 2 |
| Vulcanization accelerator *3 | 0 | 0 | 2 | 2 |
| Methacrylic acid | 8 | 14 | 0 | 23 |
| Dicumyl peroxide | 1 | 1 | 0 | 1 |
| Calcium carbonate | 0 | 0 | 25 | 25 |

*1: JSR01 (trade name), manufactured by Japan Synthetic Rubber Co., Ltd.
*2: IR-2200 (trade name), manufactured by Kuraray Co., Ltd.
*3: N-cyclohexyl-2-benzothiazyl sulfenamide

TABLE 2

|  | Amount (parts by weight) |
| --- | --- |
| Water | 88 |
| Glycerin | 12 |
| Clay | 20 |
| Barium sulfate | 85 |

In the production of the liquid center, a paste shown in Table 2 was firstly casted in a mold cooled with a refrigerant carrier, and then frozen to prepare a spherical core having a diameter of about 27 mm.

Then, four kinds of rubber compositions for center rubber shown in Table 1 were molded into a sheet, respectively, and the above frozen spherical core was covered with the sheet. After stamping, the core was put in a mold and subjected to heat compression molding at 155° C. for 30 minutes to prepare 12 liquid centers having a diameter of about 31 mm.

Then, each liquid center was frozen and a thread rubber was wound around the liquid center so that an outer diameter became about 39.6 mm to make a thread wound core. The thread wound core was covered with a balata cover, then painted to make a thread wound golf ball having a diameter of 42.7 mm. The thread rubber used is made of a blend rubber of a natural rubber and an isoprene rubber [blend ratio (weight ratio): 30:70, thickness: 0.5 mm, width: 1.5 mm]. The cover composition is as shown in Table 3.

TABLE 3

|  | Amount (parts by weight) |
| --- | --- |
| TP-301 *4 | 90 |
| Natural rubber | 10 |
| Titanium oxide | 15 |
| Sulfur | 1 |
| Vulcanization accelerator | 2 |
| Zinc oxide | 5 |

*4: Trade name, synthetic trans-polyisoprene, manufactured by Kuraray Co., Ltd.

Regarding the thread wound golf balls of Examples 1 to 2 and Comparative Examples 1 to 2 thus obtained, the ball weight, compression deformation, ball initial velocity, spin, flying distance (carrier and total), durability and hit feeling were examined. The results are shown in Table 4.

Furthermore, the measuring method of the compression deformation, ball initial velocity, spin, flying distance and durability as well as evaluation method of the hit feeling are as follows.

Compression deformation:

The amount of deformation of a golf ball formed between initial loading (10 kg) and final loading (130 kg) is measured. An average value of the results (n=12) is shown in Table 4.

Ball initial velocity;.

A golf ball is hit at a head speed of 180 ft/second using a rotating wheel type ball initial velocity measuring apparatus (measuring apparatus manufactured according to the specification of U.S. Pat. No. 3,509,736) to measure a ball initial velocity. An average value of the results (n=12) is shown in Table 4. The measuring temperature is 23° C.

Spin:

A golf ball is hit with a No. 1 wood club at a head speed of 45 m/second using a swing robot manufactured by True Temper Co. and spin was determined by taking a photograph of the golf ball. An average value of the results (n=12) is shown in Table 4.

Flying distance:

The golf ball is hit with No. 1 wood club at a head speed of 45 m/second using a swing robot manufactured by True Temper Co. and a flying distance was measured. An average value of the results (n=12) is shown in Table 4. A carry is a distance to a drop point, and a total is a total distance of the carry and a run (rolled distance).

Durability:

A golf ball is repeatedly fired from an air gun using an air gun type durability test apparatus (durability test machine adopting a system of firing a golf ball from an air gun to strike it against a rigid plate) to strike it against the rigid plate at a speed of 50 m/second from the air gun, and the number of times until the center bag of the golf ball is broken is recorded. Each golf ball (n=12) was tested to record the number of the golf balls of which center bag was broken until the number of firing reached 100. In Table 4, the total number of the golf balls is described in the denominator and that of the golf balls of which center bag was broken is described in the numerator.

Hit feeling:

The golf ball is practically hit with No. 1 wood club by 10 top professional golfers to evaluate the hit feeling.

TABLE 4

|  | Example No. | | Comparative Example No. | |
| --- | --- | --- | --- | --- |
|  | 1 | 2 | 1 | 2 |
| Ball weight (g) | 45.3 | 45.4 | 45.3 | 45.8 |
| Compression deformation (mm) | 2.80 | 2.77 | 2.86 | 2.61 |
| Ball initial velocity (ft/s) | 253.5 | 253.4 | 252.4 | 253.7 |
| Spin (rpm) | 3534 | 3593 | 3521 | 3498 |
| Flying distance | | | | |
| Carry (yard) | 228.5 | 228.1 | 224.7 | 227.7 |
| Total (yard) | 245.1 | 245.0 | 242.3 | 243.3 |
| Durability | 0/12 | 0/12 | 5/12 | 0/12 |
| Hit feeling | Good | Good | Good | Hard |

The golf ball of Comparative Example 1 is a golf ball corresponding to a thread wound golf ball using a conventional liquid center and is used as a criterion for comparison. As is shown in Table 4, the golf balls of Examples 1 to 2 showed a large flying distance and were Superior to the golf ball of Comparative Example 1 in durability. Furthermore, the golf balls of Examples 1 to 2 showed a large ball initial velocity in comparison with the golf ball of Comparative Example, however, the ball initial velocity was smaller than the upper limit of the standard value such as 255 ft/second.

In addition, the golf balls of Examples 1 to 2 showed large spin and were superior in hit feeling and spin performances. Furthermore, they maintained excellent control properties which are the same as those of the golf ball of Comparative Example 1, and no deterioration of hit feeling and control properties attended with the accomplishment of high resilience was admitted.

To the contrary, the golf ball of Comparative Example 2 is superior in flying distance and durability, however, the center bag thereof becomes considerably hard because the amount of methacrylic acid to be formulated is large. Therefore, the hit feeling became hard like a stone, and it is not preferred.

What is claimed is:

1. A thread wound golf ball comprising a liquid center formed from a center bag filled with liquid, a thread layer wound on the liquid center and a cover covering the thread layer, wherein the center bag is made of a crosslinked rubber obtained from a rubber composition comprising:

(a) a rubber component containing a mixture of 10 to 80% by weight of cis-1,4-polybutadiene and 90 to 20% by weight of a natural rubber or cis-isoprene rubber as a base rubber (b) either a metal salt of an unsaturated carboxylic acid selected from the group consisting of acrylic acid and methacrylic acid, or a combination of the unsaturated carboxylic acid and metal oxide forming a metal salt with the unsaturated carboxylic acid, and (c) a peroxide crosslinking agent, the component (b) being present in an amount 3 to 20 parts by weight based on 100 parts by weight of the component (a) when calculated in terms of an amount of the unsaturated carboxylic acid.

2. Tho thread wound golf ball according to claim 1 wherein said rubber component (a) further comprises styrene-butadiene rubber, ethylene-propylene-diene rubber (EPDM), butadiene rubber other than cis-1,4-polybutadiene or butyl rubber.

3. The thread wound golf ball according to claim 2 wherein the base rubber is present in an amount of not less than 80% by weight in the rubber component (a).

4. The thread wound golf ball according to claim 1 wherein said metal salt of the unsaturated carboxylic acid is selected from the group consisting of zinc methacrylate, zinc acrylate, magnesium methacrylate, calcium methacrylate, and a mixture thereof.

5. The thread wound golf ball according to claim 1 wherein, when the component (b) is the combination of acrylic acid or methacrylic acid and a metal oxide, the metal oxide is selected from the group consisting of zinc oxide, magnesium oxide and calcium oxide.

6. The thread wound golf ball according to claim 1 wherein said peroxide crosslinking agent is dicumyl peroxide or 1,1-bis-3,3,5-trimethylcyclohexane.

7. The thread wound golf ball according to claim 1 wherein said peroxide crosslinking agent is present in an amount of 0.3 to 3 parts by weight, based on 100 parts by weight of the rubber component (b).

8. The thread wound golf ball according to claim 1 wherein said rubber composition further comprises an additive.

9. The thread wound golf ball according to claim 8 wherein said additive is selected from the group consisting of color agent, peptizer, and zinc stearate.

10. The thread wound golf ball according to claim 1 wherein a liquid for said liquid center is water, an aqueous solution wherein zinc chloride is dissolved in water or a paste wherein barium sulfate is dispersed in water.

11. The thread wound golf ball according to claim 10 wherein said liquid is the following ingredients:

| Ingredient | Amount (parts by weight) |
|---|---|
| Water | 88 |
| Glycerine | 12 |
| Clay | 20 |
| Barium sulfate | 50 to 150 |

12. The thread wound golf ball according to claim 1 wherein said liquid center has a specific gravity of not less than 1.1.

13. The thread wound golf ball according to claim 1 wherein said center bag has a thickness of 1 to 3 mm, a hardness measured using a JIS-A type hardness tester of 40 to 60 and a diameter of 25 to 34 mm.

* * * * *